(12) United States Patent
Okamura

(10) Patent No.: US 6,606,029 B1
(45) Date of Patent: Aug. 12, 2003

(54) ELECTRONIC TAG DEVICE

(75) Inventor: Eiji Okamura, Tokyo (JP)

(73) Assignee: Leading Information Technology Institute, Inc., Tokyo (JP)

( * ) Notice: Subject to any disclaimer, the term of this patent is extended or adjusted under 35 U.S.C. 154(b) by 85 days.

(21) Appl. No.: 09/746,845

(22) Filed: Dec. 21, 2000

(30) Foreign Application Priority Data

Jan. 31, 2000 (JP) ........................................ 2000-021916

(51) Int. Cl.⁷ .............................................. G08B 13/14
(52) U.S. Cl. .................................. 340/572.8; 340/572.9
(58) Field of Search ........................... 340/572.8, 572.9, 340/572.2, 572.1, 572.4

(56) References Cited

U.S. PATENT DOCUMENTS

| | | | | |
|---|---|---|---|---|
| 4,196,424 A | * | 4/1980 | Williamson | 340/572 |
| 4,603,326 A | * | 7/1986 | Freed | 340/572 |
| 5,025,246 A | * | 6/1991 | Schenkel | 340/572 |
| 5,367,289 A | * | 11/1994 | Baro et al. | 340/566 |
| 5,421,177 A | * | 6/1995 | Sieber et al. | 70/57.1 |
| 5,587,703 A | * | 12/1996 | Dumont | 340/568.2 |
| 5,689,237 A | * | 11/1997 | Sasagawa et al. | 340/568 |
| 5,717,382 A | * | 2/1998 | Cooper | 340/572 |
| 5,945,909 A | * | 8/1999 | Kolton | 340/572.1 |
| 5,949,336 A | * | 9/1999 | Deschenes et al. | 340/572.8 |
| 5,955,951 A | * | 9/1999 | Wischerop et al. | 340/572.8 |
| 5,969,613 A | * | 10/1999 | Yeager et al. | 340/572.9 |
| 5,990,791 A | * | 11/1999 | Andreasen et al. | 340/572.1 |
| 6,025,781 A | * | 2/2000 | Deschenes | 340/572.8 |
| 6,144,301 A | * | 11/2000 | Frieden | 340/572.8 |
| 6,157,302 A | * | 12/2000 | Kolton et al. | 340/572.7 |
| 6,222,452 B1 | * | 4/2001 | Ahlstrom et al. | 340/572.1 |
| 6,304,184 B1 | * | 10/2001 | Kolton et al. | 340/572.8 |

\* cited by examiner

Primary Examiner—John Tweel

(57) ABSTRACT

An electronic tag device is attached to products, such as accessories, clothing, shoes, bags, and wallets, of an indefinite and/or complex shape on which the use of a visually identifiable tag may be difficult due to bending or folding. The electronic tag device comprises an electronic tag 1 and an attaching implement 2, and is attached to a product 3 via the attaching implement 2. The product 3 is an article such as an accessory, article of clothing, shoe, bag, or wallet with an indefinite and/or complex shape, while the electronic tag 1 is a non-contact-type wireless tag in which information about the product is recorded. Preferably, each tag is provided with tilting means at one end of the tag for cooperating with an inwardly protruding lip of a receptacle to facilitate the tilting of the uppermost tag of a vertical stack of similarly shaped tags retained inside the receptacle.

15 Claims, 7 Drawing Sheets

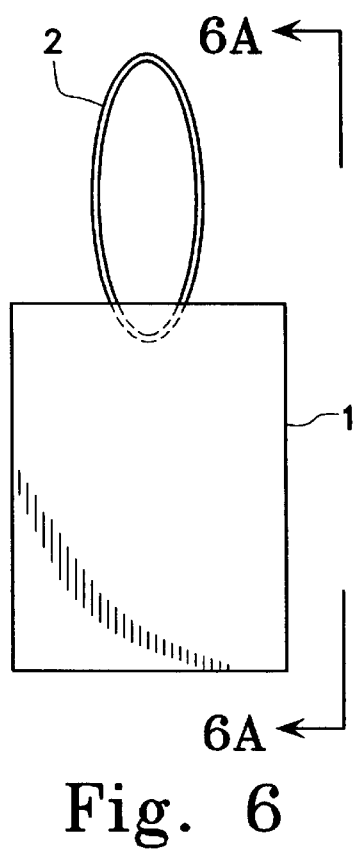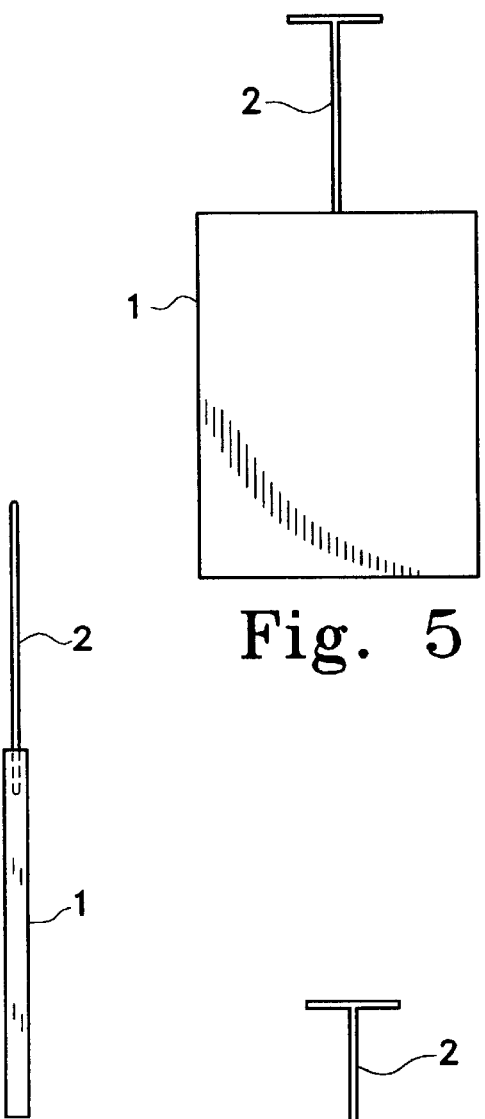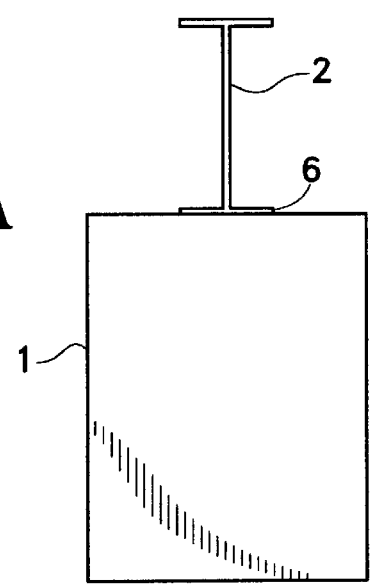

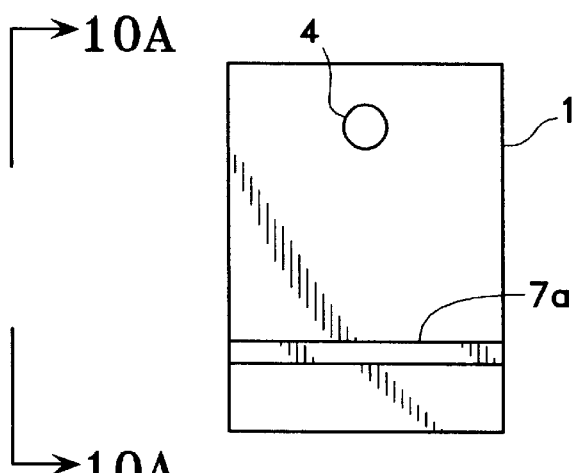 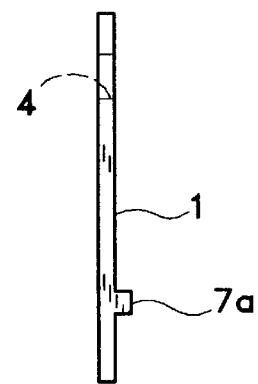
Fig. 10    Fig. 10A
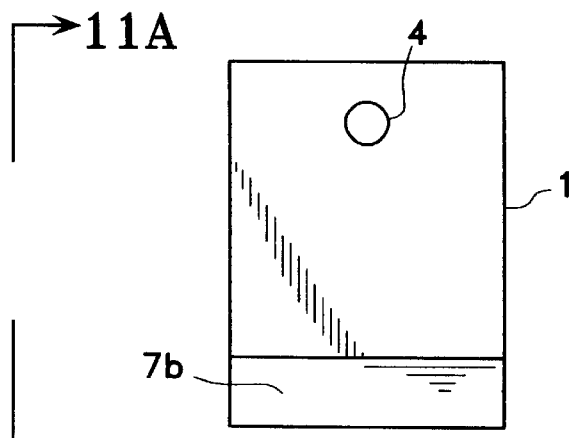 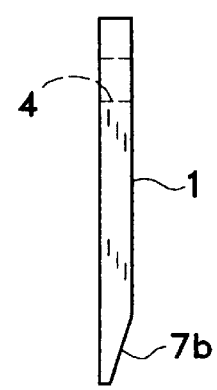
Fig. 11    Fig. 11A
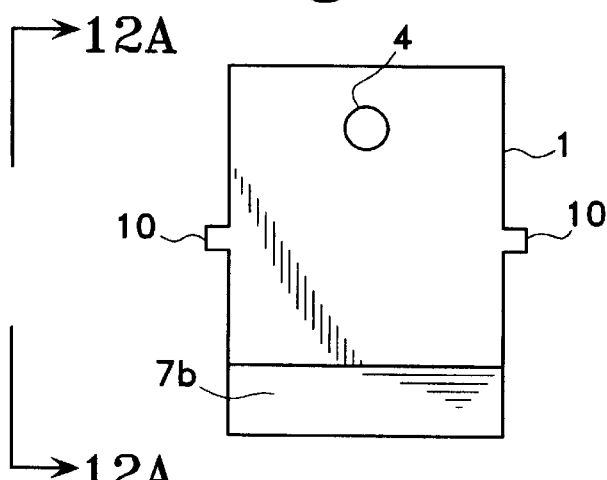 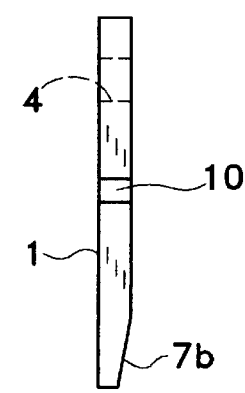
Fig. 12    Fig. 12A

ELECTRONIC TAG DEVICE

TECHNICAL FIELD

The present invention relates to an electronic tag device, and more particularly to an electronic tag device that may be readily applied to various types of goods.

BACKGROUND ART

As shown in FIG. 18, a bar code 1A printed on packaging 3A is widely used in the prior art as a means of identifying various goods, and a packaged product is identified by reading bar code 1A printed on packaging 3A.

Further, as shown in FIG. 19, a tag 1B marked with a barcode is attached to an article of clothing 3 by means of an attaching implement 2, and article of clothing 3 is identified by reading the bar code on tag 1B.

DISCLOSURE OF INVENTION

However, in the prior art example shown in FIG. 18, when the packaging 3A is removed the bar code 1A is also removed. Items inside the packaging 3A such as articles of clothing, accessories, shoes, handbags, wallets, and the like cannot be evaluated for their design, color, and material when they are marketed because a bar code tag cannot be attached to them.

Further, in the prior art example shown in FIG. 19, this problem is solved by attaching the tag 1B marked with a barcode to the item 3. However, articles of clothing and accessories are often displayed and moved in the folded state, and the tag 1B frequently becomes wrapped up therein and thus it is unable to be seen.

Similarly, shoes, handbags, wallets and the like often have tag 1B placed inside the item, and thus it is unable to be seen.

Moreover, with respect to printing or attaching a bar code to the item shown in FIG. 18, it is possible to do so by means of a bar code printing device or a bar code attachment device. That is, it is possible to attach information by means of a bar code. However, with the article of clothing shown in FIG. 19, it is difficult to fix the position of the tag relative to the bar code printing device or the bar code attachment device because the shape of the article of clothing and the like is irregular and the position of the tag is not fixed. That is, it is not possible to attach information by means of a bar code. Items that have complex shapes have the same problem, such as shoes, handbags, wallets, and the like.

As explained above, there is a problem with the method of identifying items with a bar code on articles of clothing, accessories, shoes, handbags, wallets and the like which are to be examined, are folded up, or have a complex shape, because the tag is not visible and thus cannot be read, and because it is difficult to add information thereto.

The electronic tag device of the present invention provides an electronic tag and an attaching implement, and said electronic tag can be attached to an item by means of the attaching implement.

The items are items with irregular and/or complex shapes, such as articles of clothing, accessories, shoes, handbags, wallets and the like. Further, the electronic tag is a non-contact wireless tag on which information relating to the item is recorded thereon.

DRAWINGS

FIG. 5 shows the fourth joined configuration of the electronic tag and the attaching implement of the invention.

FIG. 6 shows the fifth joined configuration of the electronic tag and the attaching implement of the invention.

FIG. 7 shows the sixth joined configuration of the electronic tag and the attaching implement of the invention.

FIG. 10 is a plan and side view showing the second shape of the electronic tag used in the invention.

FIG. 11 is a plan and side view showing the third shape of the electronic tag used in the invention.

FIG. 12 is a plan and side view showing the fourth shape of the electronic tag used in the invention.

DETAILED DESCRIPTION OF EXEMPLARY EMBODIMENTS

Figure 1:
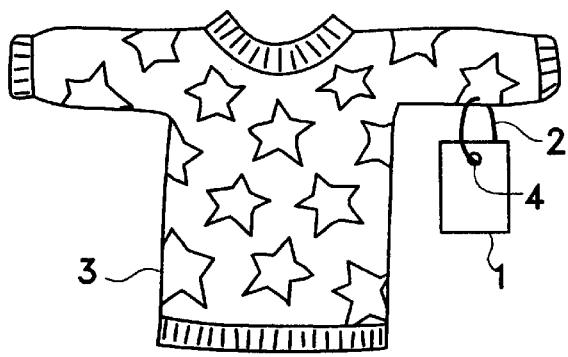
FIG. 1 shows an embodiment in which the electronic tag device of the invention has been applied.

An electronic tag according to the present invention can be applied to a product 3, such as an article of clothing shown in FIG. 1, that has an irregular shape, that changes into a complex shape, or can be folded up. In addition, the product 3 in FIG. 1 is exemplified as an article of clothing only as a matter of convenience, and the electronic tag according to the present invention can be applied to another irregularly shaped product like an article of clothing, such as things having a shape like shoes, handbags, wallets, and the like.

Figure 17:
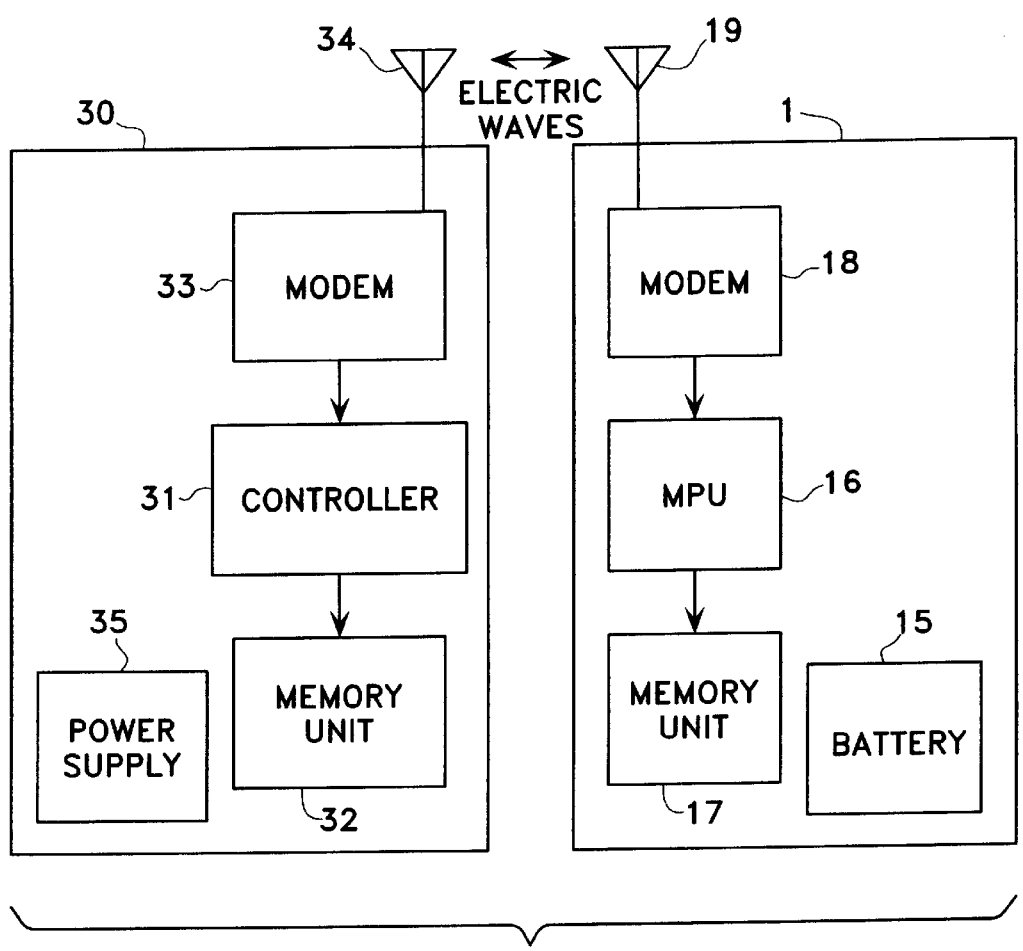
FIG. 17 is a block diagram showing one example of the electronic tag and the tag read/write device used in the invention.
Figure 19:
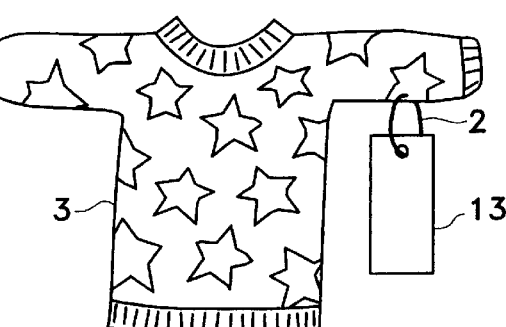
FIG. 19 is a plan view showing another conventional example of a product identified with a barcode.
Figure 18:
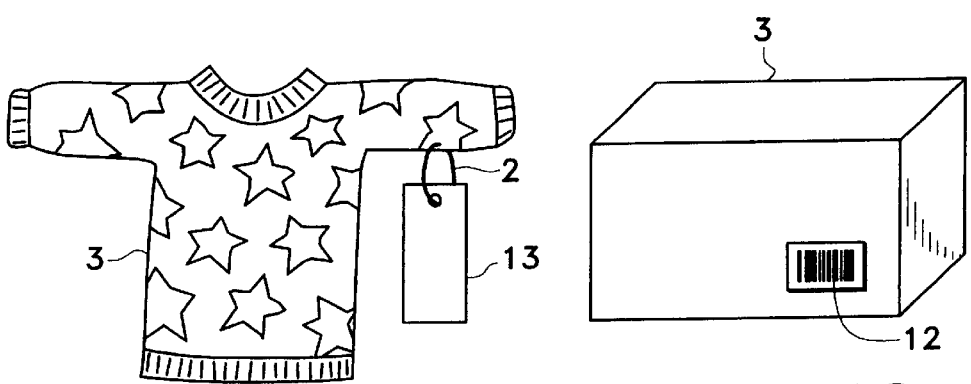
FIG. 18 is a perspective view showing a conventional example of a product identified with a barcode.

As shown in FIG. 17, electronic tag 1 is ideally a non-contact type wireless card-shaped tag that is composed of a memory unit 17 and a modem 18 controlled by MPU 16, an antenna 19 connected to modem 18, and a battery or a storage battery 15.

Information is recorded and read out from electronic tag 1 by means of tag read-write device 30. As shown in FIG. 17, tag read-write device 30 is composed of a memory unit 32 and a modem 33 controlled by a controller 31, an antenna 34 connected to modem 30, and a battery 35.

Memory 17 of electronic tag 1 has a large storage capacity, and it is possible to simply transfer the contents thereof electronically. In addition, as shown in FIG. 1, because it is small and lightweight, electronic tag 1 can be attached to product 3 without any difficulty via attachment implement 2.

Information relating to product 3 can be recorded on a data recorder in the wireless, contact-free tag.

Figure 2:
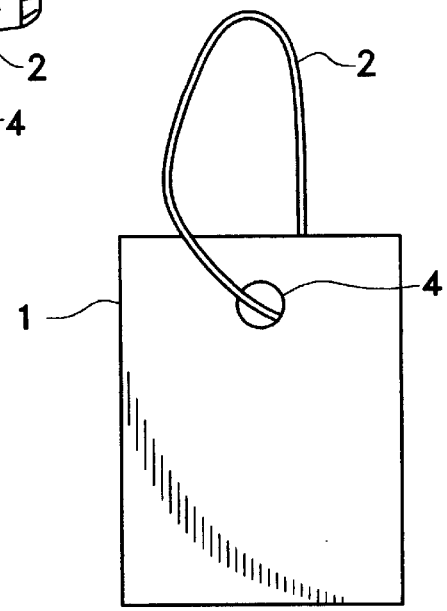
FIG. 2 shows the first joined configuration of the electronic tag and the attaching implement of the invention.
Figure 3:
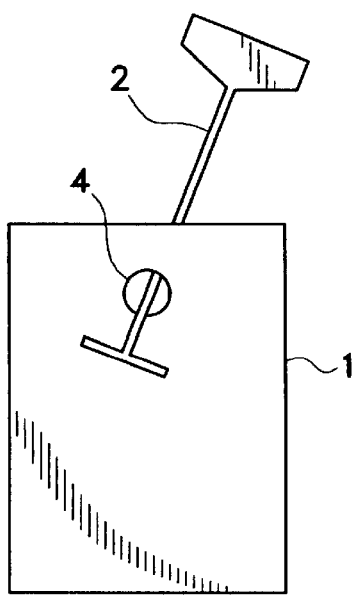
FIG. 3 shows the second joined configuration of the electronic tag and the attaching implement of the invention.
Figure 4:
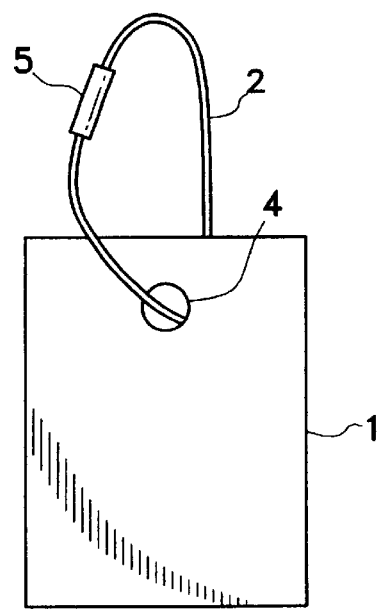
FIG. 4 shows the third joined configuration of the electronic tag and the attaching implement of the invention.

As shown in FIGS. 2–4, electronic tag 1 is a flat member formed from a polymer resin with IC type electronic components and a battery contained therein, and a hole 4 formed therein which attachment implement 2 passes through. The size of hole 4 is the same as that which has been previously used on price tags, and can be used by existing tag attachment devices.

As shown in FIG. 2, attachment implement 2 is a thread or cord and is formed from a polymer resin, fiber or similar material. Further, as shown in FIG. 3, attachment implement 2 can be furnished with a T-shaped member on one end thereof, and passed through hole 4 formed in electronic tag 1. Attachment implement 2 is composed of a polymer resin having elasticity, and thus the T-shaped member at one end thereof can be bent and passed through hole 4 by deforming it so that it is parallel with the stem thereof. Moreover, the electronic tag according to the present invention can be easily configured to be attached to articles of clothing and accessories by deforming the T-shaped member so that it is parallel with the stem, and passing it through a space between the fibers of the article of clothing or accessory, through a hole in a button, or the like.

Further, as shown in FIG. 4, attachment implement 2 of electronic tag 1 includes a joining site 5 which connects both ends thereof, and can be passed through hole 4 in electronic tag 1 and a button hole in an article of clothing, an eyelet of a shoe, a hole in a fastener, or the like.

In the embodiment shown in FIG. 1, the identity of product 3 is read from the information stored in electronic tag 1. However, even if the packaging is removed from things such as articles of clothing, accessories, shoes, handbags, wallets, and the like when it is marketed so that their design, color, material, and the like can be evaluated, it becomes possible to identify product 3 by means of electronic tag 1 either while it is being displayed or after it is displayed because it can be attached directly to product 3.

In the case of articles of clothing and accessories, even though they are often displayed and moved in the folded state, and electronic tag 1 frequently becomes wrapped up in product 3 and thus is unable to be seen. the stored information can be easily read out therefrom because the electronic tag is a wireless and contact-free tag.

Further, even with shoes, handbags, wallets, and the like, even if a similar electronic tag is place inside the product and it becomes unable to be seen, the recorded information can be electronically read out therefrom without any difficulty.

Moreover, in cases where information is to be amended, if electronic tag 1 is a wireless and contact-free tag, the positioning between a read-out device and the electronic tag 1 is extremely gentle, and it is possible to easily amend the information without the necessity that the tag be visible.

FIG. 5 shows a plan view of another embodiment of an electronic tag using the electronic tag device according to the present invention. The electronic tag 1 and attachment implement 2 shown in FIG. 5 are formed from a single piece of polymer resin having elasticity, and similar to the attachment implement 2 shown in FIG. 3, an end portion of the attachment portion 2 is comprised of a T-shaped member that is easily bent. This electronic tag, similar to the electronic tag shown in FIG. 3, can be easily attached to articles of clothing and accessories, and the work of passing attachment implement 2 through the attachment hole of electronic tag 1 can be eliminated.

Moreover, FIG. 6 shows a plan view and a side view of another embodiment of an electronic tag using the electronic tag device according to the present invention. The electronic tag shown in FIG. 6 is also comprised of an attachment implement 2, and one part of attachment implement 2 is embedded into the seal of electronic tag 1 and are unitarily formed. It goes without saying that the work of connecting electronic tag 1 and attachment implement 2 is eliminated.

Moreover, the electronic tag shown in FIG. 7 is also comprised of an attachment implement 2. A first end of attachment implement 2 has a T-shaped member, and a second end thereof has an adhesion site 6 which is adhered to electronic tag 1. This electronic tag 1 can also be easily attached to a product by bending the T-shaped portion of attachment implement 2, and the work of attaching attachment implement 2 to electronic tag 1 can be eliminated.

Figure 8:
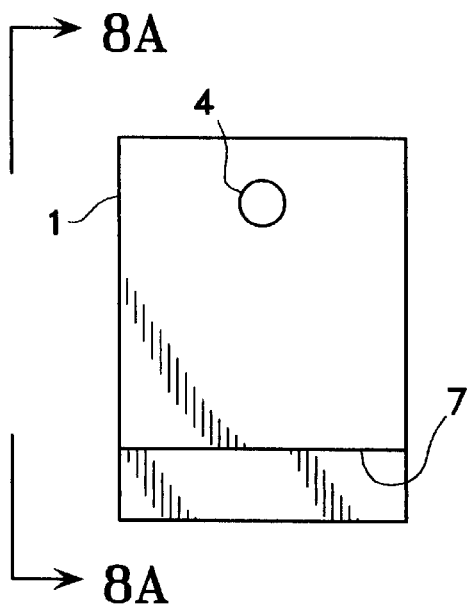
FIG. 8 is plan and side view showing the first shape of the electronic tag used in the invention.
Figure 8A:
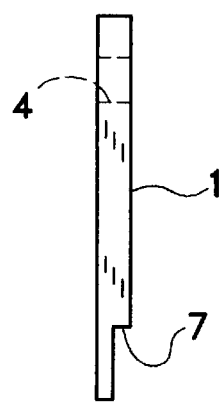

As shown in the plan view and side view shown in FIG. 8, in another embodiment of an electronic tag using the electronic tag device according to the present invention, a hole 4 is formed in electronic tag 1, and on the lower rear face of electronic tag 1 forms a stepped portion 7.

Figure 9:
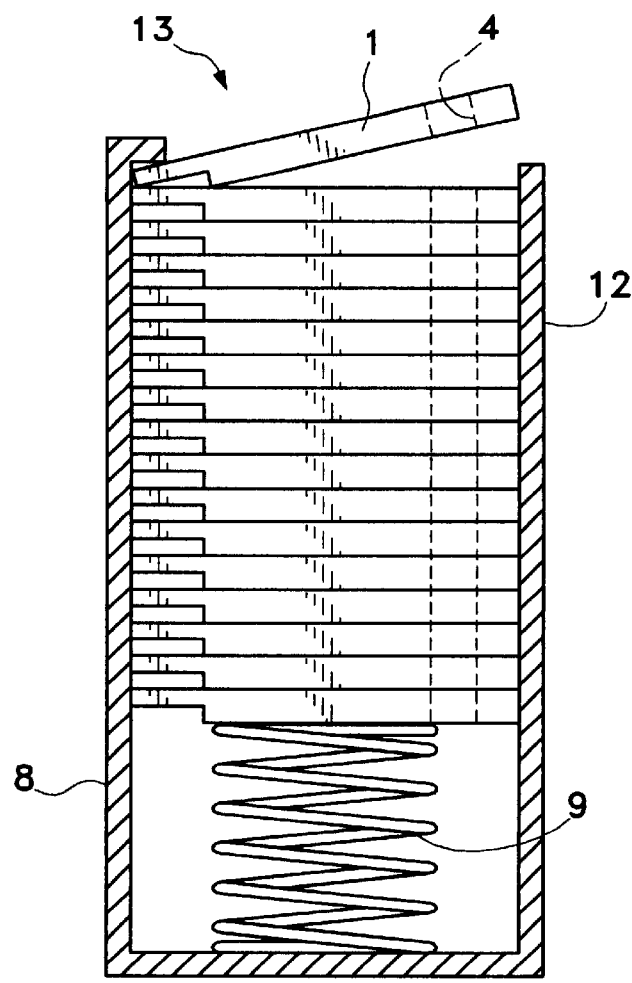
FIG. 9 is a cross section showing the electronic tag of the invention loaded into the first receptacle.

The electronic tag shown in FIG. 8 is loaded and used in receptacle 8 shown in FIG. 9. Receptacle 8 is composed of a frame 12 which stores a plurality of electronic tags 1, and a spring 9 which pushes the stored electronic tags 1 upward. The plurality of electronic tags 2 are loaded into frame 12 such that the position of step portions 7 are stacked one on top of each other, and are pushed upward by spring 9 attached to the bottom of receptacle 8.

A opening 4 is formed in the upper end of receptacle 8, and serves to remove an electronic tag 1 therefrom. However, a portion of opening 4 is equipped with a protuberance or detent 13 which contacts with the upper part of step portion 7 on electronic tag 1.

In the receptacle 8 shown in FIG. 9, a plurality of electronic tags 1 are pushed up by means of spring 9. However, step portion 7 on the uppermost electronic tag 1 is pushed by protuberance or detent 13, and one end of electronic tag 1 is lifted up in the diagonal direction. If a hole 4 is disposed in the side that is lifted up, electronic tag 1 can be easily removed from receptacle 8 by simply passing an attachment implement through hole 4. Moreover, as each electronic tag 1 is removed from receptacle 8, one end of another electronic tag 1 is pushed out in the diagonal direction and removed.

FIGS. 10 and 11 show other embodiments of the electronic tag of the present invention. The electronic tag shown in FIG. 10 has a hole 4 and a protruding portion 7a, and the electronic tag shown in FIG. 11 has a hole 4 and a tapered portion 7b.

Holes 4 are formed in the upper portion of electronic tags 1, and protruding portion 7a or tapered portion 7b are formed on the lower edge of electronic tags 1.

The electronic tags shown in FIGS. 10 and 11 can also be loaded and used in receptacle 8 shown in FIG. 9 similar to electronic tags 1 shown in FIG. 8. The operation and effect is the same.

FIG. 12 shows another embodiment of an electronic tag of the present invention. The electronic tag 1 shown in FIG. 12 is comprised of a hole 4 formed in the upper portion thereof, a tapered portion 7b formed on the lower edge thereof, and protrusions 10 formed on both sides thereof.

Figure 13:
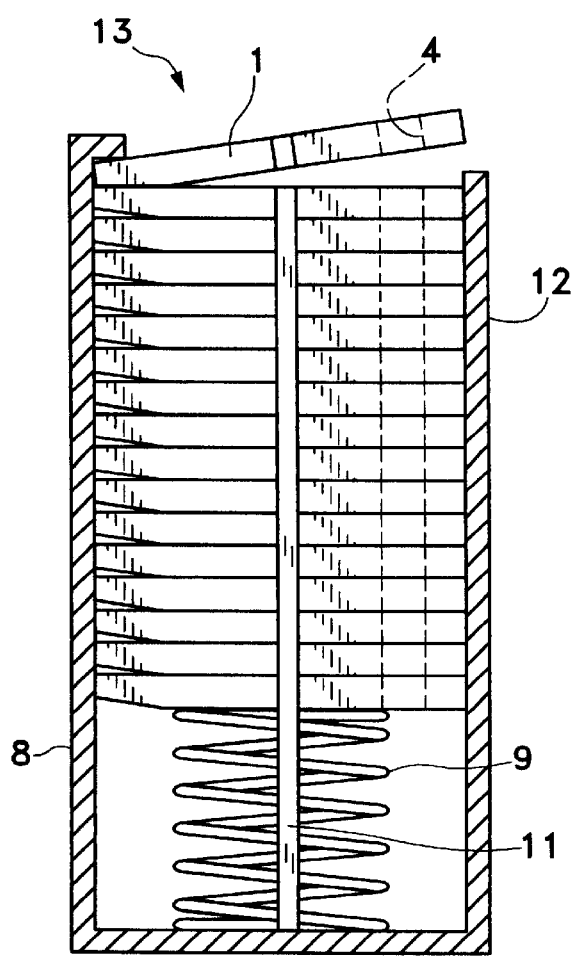
FIG. 13 is a cross section showing the electronic tag of the invention loaded into the second receptacle.
Figure 14A:
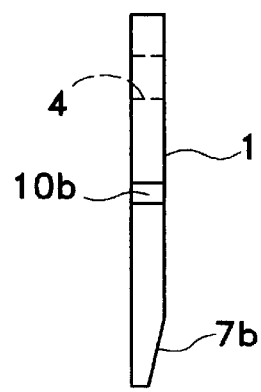

The electronic tag shown in FIG. 13 is loaded and used in receptacle 8 shown in FIG. 13. Receptacle 8 is composed of a frame 12 which stores a plurality of electronic tags 1, a spring 9 which pushes the stored electronic tags 1 upward, and a guide 11 formed on the inner walls of receptacle 8 which engage with protrusions 10 of electronic tags 1. The plurality of electronic tags 2 are loaded into frame 12 such that the position of tapered portions 7b are stacked one on top of each other, and are pushed upward by spring 9 attached to the bottom of receptacle 8.

A opening 4 is formed in the upper end of receptacle 8, and serves to remove an electronic tag 1 therefrom. However, a portion of opening 4 is equipped with a protuberance or detent 13 which contacts with the upper part of tapered portion 7b on electronic tag 1.

In the receptacle 8 shown in FIG. 13, a plurality of electronic tags 1 are pushed up by means of spring 9. However, tapered portion 7b on the uppermost electronic tag 1 is pushed by protuberance or detent 13, and one end of electronic tag 1 is lifted up in the diagonal direction. If a hole 4 is disposed in the side of electronic tag 1 that is lifted up, electronic tag 1 can be easily removed from receptacle 8 by simply passing an attachment implement through hole 4. Moreover, as each electronic tag 1 is removed from receptacle 8, one end of another electronic tag 1 is pushed out in the diagonal direction and removed.

In order for the angle of elevation of the uppermost electronic tag 1 to be large, the strength of spring 9 must be made large and the angle of the tapered portion 7b of electronic tag 1 must be made large. However, in this case, the force of the spring will be dispersed throughout the electronic tags 1 underneath the uppermost one, and this creates a problem because these electronic tags 1 will also be raised up into a slanted state.

Thus, in the electronic tag shown in FIG. 12, guides 11 in the inner walls of receptacle 8 guide protrusions 10 and suppresses the slanting of the electronic tags 1 underneath the uppermost one.

Figure 14:
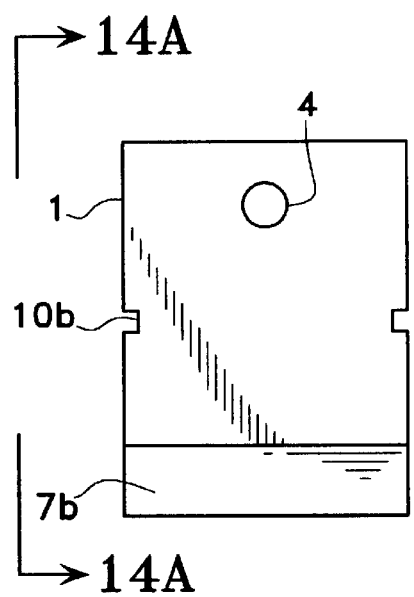
FIG. 14 is a plan and side view showing the fourth shape of the electronic tag used in the invention.

FIG. 14 shows another embodiment of an electronic tag of the present invention. The electronic tag 1 shown in FIG. 14 is comprised of a hole 4 formed in the upper portion thereof, a tapered portion 7b formed on the lower edge thereof, and grooves 10b formed on both sides thereof.

The electronic tag shown in FIG. 13 is loaded in receptacle 8. Other than convex portions formed on the inner walls of frame 12, the composition, operation and effect are simila r to receptacle 8 shown in FIG. 13.

Figures 15, 15A:
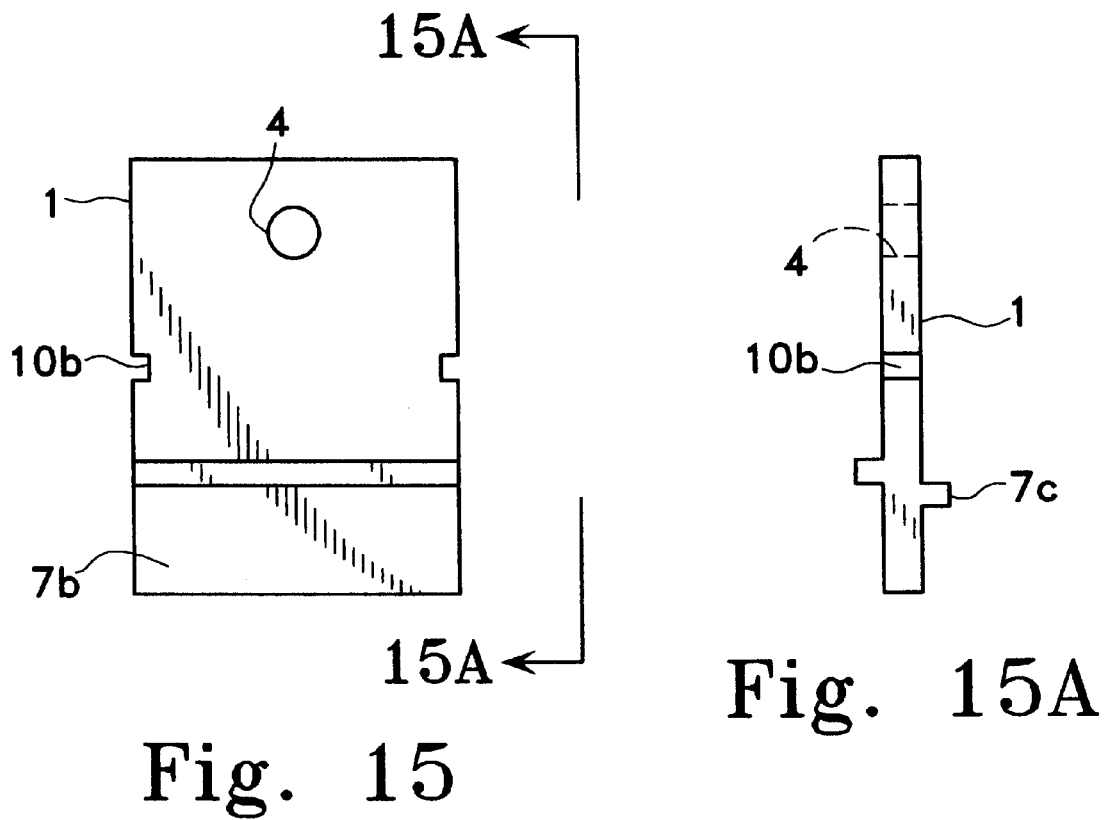
FIG. 15 is a plan and side view showing the fifth shape of the electronic tag used in the invention.

FIG. 15 shows another embodiment of an electronic tag of the present invention. The electronic tag 1 shown in FIG. 14 is comprised of a hole 4 formed in the upper portion thereof, convex portions 7c formed in staggered positions on the lower part of both front and back faces thereof, and grooves 10b formed on both sides thereof.

Figure 16:
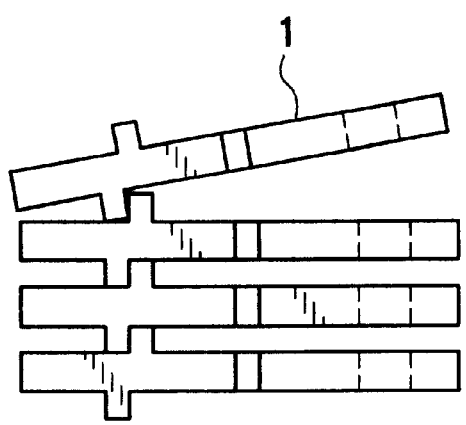
FIG. 16 is a side view showing the electronic tags seen in FIG. 15 in a stacked configuration.

As shown in FIG. 16, when a plurality of electronic tags 1 shown in FIG. 15 are stacked one on top of the other and stored in receptacle 8 shown in FIG. 13, the electronic tag 1 in the uppermost position is raised to an angle of elevation, and operates similar to the explanation of FIG. 13.

In the receptacle shown in FIG. 13, when electronic tags 1 having a slippery surface are stored therein, there is a danger that they will slip out of receptacle 8 because the force on the uppermost electronic tag 1 also increases in the horizontal direction.

The electronic tag 1 shown in FIG. 14 avoids this sort of problem because, as shown in FIG. 15, the convex portions 7c on the surface of electronic tag 1 prevent the uppermost electronic tag 1 from slipping out by mutually engaging with the convex portions 7c on the electronic tag directly above it, and thus each electronic tag stored in the receptacle is retained.

As is clear from the explanation based on the aforementioned embodiments, the following effects can be obtained by means of the electronic tag of the present invention.

First, a tag device can be provided which does not require that it be visually identifiable with products such as articles of clothing, accessories, shoes, handbags, wallets and the like that have irregular and complex shapes.

Second, a tag device can be provided which is easy to attach to products such as articles of clothing, accessories, shoes, handbags, wallets and the like that have irregular and complex shapes.

Third, a tag device can be provided in which it is possible to easily read out information relating to the product while the product is stored.

Further, the electronic tag device according to the present invention is suitable as a tag device which attaches to irregularly and/or complex shaped product such as articles of clothing, accessories, shoes, handbags, wallets and the like.

What is claimed is:

1. In an electronic tag device comprising an electronic tag and an attachment implement for attaching said electronic tag to a product, tilting means at one end of the tag for cooperating with an inwardly protruding lip of a receptacle to facilitate the tilting of the uppermost tag of a vertical stack of similarly shaped tags retained inside said receptacle.

2. The electronic tag device according to claim 1, wherein the product is selected from the group consisting essentially of articles of clothing, fashion accessories, shoes, wallets.

3. The electronic tag device according to claim 1, wherein the electronic tag is a non-contact type wireless tag.

4. The electronic tag device according to claim 1, wherein at least information relating to the product attached to said electronic tag is recorded thereon.

5. The electronic tag device according to claim 1, wherein the electronic tag has at least a hole formed therein for attaching the attachment implement.

6. The electronic tag device according to claim 1, wherein the attachment implement is a thread or cord formed from a polymer resin or fiber material.

7. The electronic tag device according to claim 1, wherein the attachment implement has at least a T-shaped portion.

8. The electronic tag device according to claim 6, wherein a joining site connects both ends of the attachment implement.

9. The electronic tag device according to claim 1, wherein a seal member of the electronic device and the attachment implement are unitarily formed.

10. The electronic tag device according to claim 1, wherein the electronic tag and attachment implement are combined together as one.

11. The electronic tag device according to claim 1, wherein said tilting means comprises a step portion formed at said one end.

12. The electronic tag device according to claim 1, wherein said tilting means comprises a tapered portion formed at said one end.

13. The electronic tag device according to claim 1, wherein said tilting means comprises a downwardly facing first convex portion adjacent said one end and a second upwardly facing second convex portion inwardly staggered from said first convex portion, the first convex portion of said uppermost tag cooperating with the second convex portion of the next tag in the receptacle to restrain said uppermost tag from slipping out of said receptacle.

14. The electronic tag device according to any of claims 1, 11, 12, or 13, wherein the sides of each electronic tag have one or more vertical protrusions or grooves formed therein for holding all but said uppermost tag in a respective horizontal alignment inside said receptacle.

15. The electronic tag device according to claim 14, wherein the vertical stack of tags is biased upwardly inside the receptacle.

* * * * *